(12) United States Patent
Ries

(10) Patent No.: US 9,934,550 B2
(45) Date of Patent: Apr. 3, 2018

(54) METHOD AND DEVICE FOR COMPOSING A MULTILAYER VIDEO IMAGE

(71) Applicant: STMICROELECTRONICS (GRENOBLE 2) SAS, Grenoble (FR)

(72) Inventor: Gilles Ries, Saint-Jean de Moirans (FR)

(73) Assignee: STMICROELECTRONICS (GRENOBLE 2) SAS, Grenoble (FR)

( * ) Notice: Subject to any disclaimer, the term of this patent is extended or adjusted under 35 U.S.C. 154(b) by 276 days.

(21) Appl. No.: 14/838,467

(22) Filed: Aug. 28, 2015

(65) Prior Publication Data
US 2016/0163019 A1 Jun. 9, 2016

(30) Foreign Application Priority Data

Dec. 5, 2014 (FR) ...................... 14 61947

(51) Int. Cl.
G09G 5/00 (2006.01)
G06T 1/60 (2006.01)
G06T 1/20 (2006.01)
G06T 11/60 (2006.01)
H04N 5/272 (2006.01)
G09G 5/397 (2006.01)
G09G 5/14 (2006.01)

(52) U.S. Cl.
CPC .................. *G06T 1/60* (2013.01); *G06T 1/20* (2013.01); *G06T 11/60* (2013.01); *G09G 5/14* (2013.01); *G09G 5/397* (2013.01); *H04N 5/272* (2013.01); *G09G 2340/12* (2013.01); *G09G 2350/00* (2013.01)

(58) Field of Classification Search
None
See application file for complete search history.

(56) References Cited

U.S. PATENT DOCUMENTS

| 6,570,579 B1* | 5/2003 | MacInnis | G06T 9/00 345/501 |
| 2003/0156115 A1* | 8/2003 | Emmot | G09G 5/395 345/531 |
| 2007/0009182 A1* | 1/2007 | Yamauchi | G09G 5/397 382/302 |
| 2016/0112723 A1* | 4/2016 | Liu | H04N 19/21 375/240.27 |

* cited by examiner

Primary Examiner — Ryan R Yang
(74) Attorney, Agent, or Firm — Slater Matsil, LLP

(57) ABSTRACT

A method for composing a multilayer video image of which the values of the pixels of the image layers are stored in a memory. The video image may include at least one first image layer and a second image layer located in front of the at least one first layer and having an opaque area. The method may include defining a region of the at least one first image layer to be hidden by the opaque area, reading from the memory the stored pixel values, with the exception of the values of the pixels of the region of the at least one first image layer, and composing the video image at least from the read pixel values.

21 Claims, 2 Drawing Sheets

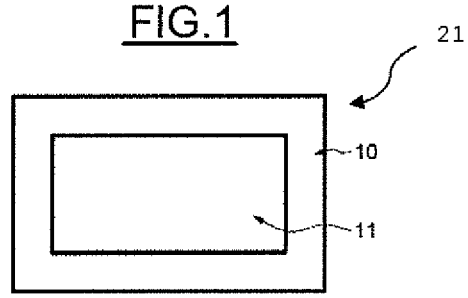
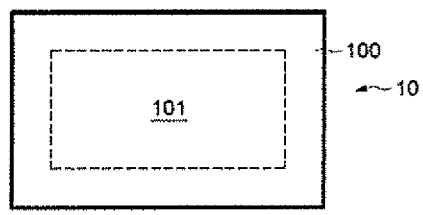
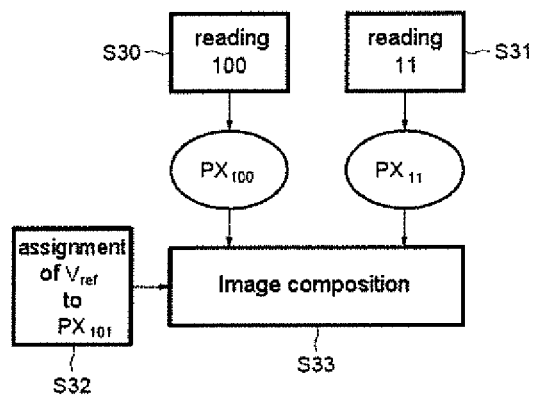

METHOD AND DEVICE FOR COMPOSING A MULTILAYER VIDEO IMAGE

TECHNICAL FIELD

Implementations and embodiments of the invention relate to the composition of multilayer video images.

BACKGROUND

Multilayer video images include a plurality of layers, such as a background, a wallpaper and an opaque foreground, and a video layer in front of the background. Generally the video layer hides a portion of the background.

Typically the values of the pixels of all the layers of the image to be composed are stored in a memory. For composing the image, the values of the pixels of the image layers are read, then the image is composed from at least some of the values of the corresponding pixels in the various image layers.

However, the pixel values of the portion of the background hidden by the video layer are unimportant in composing the image, in that the pixels of this portion of the background are hidden by the video layer. The separate reading of the values of the pixels of all the layers of the image to be composed leads to a bandwidth in reading (i.e., the flow rate of data transferred from memory) which may be relatively high in some cases, whereas some background pixels will not be seen.

SUMMARY

According to one implementation and embodiment, it is proposed to reduce the bandwidth during a multilayer image composition in which at least one image layer is at least partially hidden by another layer of this same image.

Thus, according to one aspect, a method is provided for composing a multilayer video image of which the values of the pixels of all the image layers are stored in a memory. The video image may include at least one first image layer and a second image layer located in front of the first layer and having an opaque area.

The method may include defining a region of the first image layer to be hidden by the opaque area, reading in the memory of all the stored pixel values with the exception of the pixels of the region, and composing the video image at least from the read pixel values. The first layer may be, for example, a background and the opaque area of the second layer may be a video layer.

According to one implementation, before reading in the memory, the processing unit or processor which is responsible for performing the reading may advantageously be configured for determining the opaque nature of the opaque area of the foreground to activate the function that will spare or avoid the reading of the background region. In other words, by analyzing the values contained in its internal registers, the processing unit may be capable of defining, before going on to read in the memory, the region of the first image layer intended to be hidden by the opaque area.

This may be accomplished, for example, by using video pixels for the pixels of the opaque area in YUV format which do not include an Alpha value (transparency factor), and are therefore considered opaque, or RGB pixels stored without a per-pixel Alpha value. For example, this may follow the conventional xRGB8888 or RGB565 formats, these pixels then also being considered opaque.

In other words, as stated above, the definition of the region of the first image layer may advantageously be performed before reading in the memory by information specifying the opaque nature of the opaque area. The information may include, as specified above, for each pixel of the opaque area, an indication signifying that this pixel is opaque (format used without Alpha value or Alpha value specifying the opaque nature of the pixel, etc.).

One approach for composing the video image may be to ignore the hidden pixels of the first image layer and only take into account the corresponding pixels of the video layer for preparing the corresponding pixels of the image. However, another approach provides for assigning a reference value to each pixel of the hidden region of the first image layer and composing the video image from the read pixel values and the assigned reference values. This offers the advantage of homogeneity for the pixels (i.e., all the pixels are assigned values).

In any event, as the corresponding pixels of the (opaque) video layer area are assigned a coefficient of transparency indicating that they are opaque, the assigned reference values will have no effect when applying the mathematical formula for combining pixels for preparing the final values of the image pixels. Although this is optional, it may be done for reasons of simplification, in that the reference value is the same for all the pixels of the region.

As mentioned previously, this reference value is actually not necessarily important and may be arbitrary since it will disappear, given that the pixels in the region will be hidden in any case. Consequently, a reference value may used, for example, correspond to a black pixel.

According to another aspect, a device is provided for composing a multilayer video image, including an interface to be coupled to a memory storing the values of the pixels of the layers of the image and including at least one first image layer and a second image layer located in front of the first layer and having an opaque area. A processing unit may be configured for reading in the memory all the stored pixel values, with the exception of the pixel values of the region of the first image layer hidden by the opaque area, and composing the video image at least from the read pixel values.

According to an example embodiment, the processing unit may be further configured for, prior to the reading in the memory, identifying in the memory the region of the first image layer from information available in the processing unit, and specifying the opaque nature of the opaque area. This identification may thus be performed, as described previously, by analyzing the values contained in the internal registers of the processing unit. This information may include, for each pixel of the opaque area, an indication signifying that this pixel is opaque.

According to one embodiment, the processing unit may be further configured for assigning a reference value to each pixel of the region, and for composing the video image also from the assigned pixel reference values. According to yet another aspect, an integrated circuit is provided including a composing device as discussed briefly above.

BRIEF DESCRIPTION OF THE DRAWINGS

Other advantages and features will be evident upon examination of the detailed description of implementations and embodiments, which is in no way restrictive, and the attached drawings, in which:

FIGS. 1 and 2 are schematic drawings illustrating image layers used in accordance with example embodiments.

FIG. 3 is a flow diagram of an example video processing method in accordance with an example embodiment.

DETAILED DESCRIPTION

Figure 4:
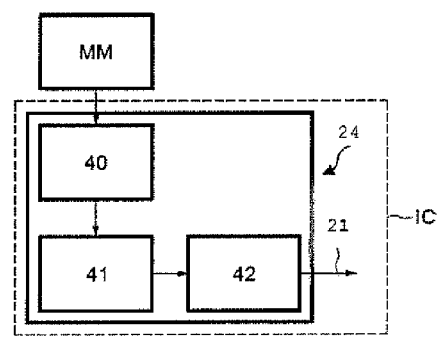
FIG. 4 is a schematic diagram of a video processing device in accordance with an example embodiment.

In FIG. 1, an image 21 is shown that is to be composed and which may be displayed on a screen. In the example described here, the image 21 includes a first image layer 10 (e.g., a background), and a second image layer 11 (e.g., a video layer) which is located in front of the background 10 and which is opaque. That is, the video layer 11 will hide the portion of the background 10 which is located behind the video layer.

This is illustrated more precisely in FIG. 2. Here it may be seen that the background 10 includes a first region 100 which is to appear in the image 21 and is to be visible to the user, and a second region 101 which is to be hidden by the opaque area 11 of the video layer.

The pixels of the video layer are assigned values. More particularly, when these pixels are in YUV format, the pixel values include values for luminance Y, and chrominance U and V. In this format it is implicit that the whole video layer is regarded as opaque.

RGB pixels may also be adopted (in this case, the values of the pixels in the video layer include the red R, green G, and blue B values) but stored without an Alpha value (the Alpha coefficient designating a transparency factor). For example, this may be done following the conventional xRGB8888 or RGB565 formats. Here again, all the pixels of the video layer will be considered opaque. These two formats may be used to identify that the video layer pixels are opaque and therefore to define, before reading the memory, that the second region 101 of the background will be hidden by the video layer.

The pixels of the background 10 are also assigned values. For example, the format may be YUV or ARGB with A=1. The values of all the pixels of the image, i.e., the pixels of the video layer 11 and of the whole background 10, are stored in a memory MM (FIG. 4). By way of example, the memory MM may be a DDR SDRAM memory (Double Data Rate Synchronous Dynamic Random Access Memory).

As illustrated in FIG. 3, for composing the image 21, the pixel values $PX_{100}$ included in the first region 100 of the background are read (Block S30) in the memory. The pixel values $PX_{11}$ of the video layer 11 are also read (Block S31) separately in the memory.

On the other hand, the pixel values $PX_{101}$ of the second region 101 of the background, which is intended to be hidden by the video layer 11, are not read in the memory MM. Indeed, these pixels $PX_{101}$ will be hidden and not visible in the image. Optionally, a reference value $V_{ref}$ (Block S32) may be assigned to the pixels $PX_{101}$ so that, for reasons of homogeneity, all the pixels are similarly assigned values. In any event, as the reference value of these pixels $PX_{101}$ is not required because these pixels will be hidden, any reference value may be selected, e.g., a reference value corresponding to a black pixel.

The image is then composed (Block S33) from the read values of the pixels $PX_{100}$, the read values of the pixels $PX_{11}$, and the values $V_{ref}$. In this implementation, the values $V_{ref}$ will be used in the mathematical formula for combining the pixel values to obtain the final values of pixels in the image, but the values $V_{ref}$ will, in fact, be ineffective in this combination because of the opaque nature of corresponding pixels of the video layer 11. Alternatively, a reference value need not be assigned to these pixels in the region 101, and they may be ignored when composing the image.

Physically, as illustrated in FIG. 4, an image composing device 24 (which may be incorporated within an integrated circuit IC, for example), illustratively includes an interface 40, such as a DMA (Direct Memory Access) interface. The DMA interface is to be coupled to the memory MM and a processing unit or processor 41, e.g. a microcontroller. The processing unit 41 may be configured for, prior to reading in the memory MM, identifying in the memory MM (e.g., by analyzing the values in the internal registers thereof), the region 101 of the first image layer 10 from information specifying the opaque nature of the opaque area 11.

The processing unit 41 may be further configured to read from the memory MM, via the interface 40, all the stored pixel values, with the exception of the pixel values of the region 101 of the first image layer 10 hidden by the opaque area of the video layer 11. The processing unit may further assign the reference value $V_{ref}$ to each pixel of the region 101, and compose the video image in accordance with the step described above with reference to Block S33.

The processing unit 41 may be of a conventional structure. The device may further include an output interface 42 connected, for example, to an HDMI cable for receiving and delivering the composed final values of the pixels of the image 21.

The bandwidth, i.e., the number of pieces of data actually read from the memory, is thus reduced. This is because, in regard to the background 10, only the pixels of the background content 10 contained in the first region 100 are read.

The invention claimed is:

1. A method for generating a video image comprising a first image layer including a plurality of first pixel values and a second image layer in front of the first image layer, the second image layer including a plurality of second pixel values, an entirety of the second image layer being smaller in extent than an entirety of the first image layer, the entirety of the second image layer being regarded as opaque, the method comprising:

storing the first pixel values for the first image layer and the second pixel values for the second image layer in a memory;

defining a region of the first image layer to be hidden by the entirety of the second image layer;

reading the stored first and second pixel values for the first image layer and the second image layer from the memory, with the exception of the stored first pixel values for the defined region of the first image layer; and generating the video image from the first and second pixel values read from the memory.

2. The method of claim 1 wherein defining the region of the first image layer is performed before reading and is based upon information specifying an opaque nature of the second image layer.

3. The method of claim 2 wherein the information includes, for each pixel value of the second image layer, an indication signifying that the pixel is opaque.

4. The method of claim 1 further comprising assigning a reference value for each first pixel value of the defined region of the first image layer; and wherein generating comprises generating the video image from the first and second pixel values read from the memory and the reference values.

5. The method of claim 4 wherein each reference value is the same for all the first pixel values of the defined region of the first image layer.

6. The method of claim 5 wherein the reference value corresponds to a black pixel value.

7. The method of claim 1 wherein the first image layer comprises a background layer, and wherein the second image layer comprises a video area.

8. A device for generating a video image comprising a first image layer including a plurality of first pixel values and a second image layer in front of the first image layer, the second image layer including a plurality of second pixel values, an entirety of the second image layer being smaller in extent than an entirety of the first image layer, the entirety of the second image layer being regarded as opaque, the device comprising:

a memory configured to store the first pixel values for the first image layer and the second pixel values for the second image layer;

an interface configured to be coupled to said memory; and a processor coupled to said interface and configured to define a region of the first image layer to be hidden by the entirety of the second image layer, read the stored first and second pixel values for the first image layer and the second image layer from said memory via said interface, with the exception of the stored first pixel values for the defined region of the first image layer, and generate the video image from the first and second pixel values read from the memory.

9. The device of claim 8 wherein said processor is configured to define the region of the first image layer before reading based upon information specifying an opaque nature of the second image layer.

10. The device of claim 9 wherein the information includes, for each pixel value of the second image layer, an indication signifying that the pixel is opaque.

11. The device of claim 8 wherein said processor is further configured to assign a reference value for each first pixel value of the defined region of the first image layer, and generate the video image from the first and second pixel values read from said memory and the reference values.

12. The device of claim 11 wherein each reference value is the same for all the first pixel values of the defined region of the first image layer.

13. The device of claim 12 wherein the reference value corresponds to a black pixel value.

14. The device of claim 8 wherein the first image layer comprises a background layer, and wherein the second image layer comprises a video area.

15. An integrated circuit for generating a video image comprising a first image layer including a plurality of first pixel values and a second image layer in front of the first image layer, the second image layer including a plurality of second pixel values, an entirety of the second image layer being smaller in extent than an entirety of the first image layer, the entirety of the second image layer being regarded as opaque, the integrated circuit comprising:

an interface configured to be coupled to a memory, the memory configured to store the first pixel values for the first image layer and the second pixel values for the second image layer; and a processor coupled to said interface and configured to define a region of the first image layer to be hidden by the entirety of the second image layer, read the stored first and second pixel values for the first image layer and the second image layer from the memory via said interface, with the exception of the stored first pixel values for the defined region of the first image layer, and generate the video image from the first and second pixel values read from the memory.

16. The integrated circuit of claim 15 wherein said processor is configured to define the region of the first image layer before reading based upon information specifying an opaque nature of the second image layer.

17. The integrated circuit of claim 16 wherein the information includes, for each pixel value of the second image layer, an indication signifying that the pixel is opaque.

18. The integrated circuit of claim 15 wherein said processor is further configured to assign a reference value for each first pixel value of the defined region of the first image layer, and generate the video image from the first and second pixel values read from the memory and the reference values.

19. The integrated circuit of claim 18 wherein each reference value is the same for all the first pixel values of the defined region of the first image layer.

20. The integrated circuit of claim 19 wherein the reference value corresponds to a black pixel value.

21. The integrated circuit of claim 15 wherein the first image layer comprises a background layer, and wherein the second image layer comprises a video area.

* * * * *